(12) United States Patent
Yuan

(10) Patent No.: US 12,444,936 B2
(45) Date of Patent: Oct. 14, 2025

(54) SYSTEM POWER SUPPLY

(71) Applicant: HEFEI YITONG ELECTRONIC TECHNOLOGY CO., LTD, Anhui (CN)

(72) Inventor: Tinghua Yuan, Anhui (CN)

(73) Assignee: HEFEI YITONG ELECTRONIC TECHNOLOGY CO., LTD, Anhui (CN)

(*) Notice: Subject to any disclaimer, the term of this patent is extended or adjusted under 35 U.S.C. 154(b) by 272 days.

(21) Appl. No.: 18/284,536

(22) PCT Filed: Mar. 15, 2022

(86) PCT No.: PCT/CN2022/080959
§ 371 (c)(1),
(2) Date: Dec. 6, 2023

(87) PCT Pub. No.: WO2022/218086
PCT Pub. Date: Oct. 20, 2022

(65) Prior Publication Data
US 2024/0162702 A1    May 16, 2024

(30) Foreign Application Priority Data
Apr. 12, 2021    (CN) .......................... 202110390283.5

(51) Int. Cl.
*H02J 1/06* (2006.01)
*H02M 1/32* (2007.01)
*H02M 3/24* (2006.01)

(52) U.S. Cl.
CPC ................. *H02J 1/06* (2013.01); *H02M 3/24* (2013.01); *H02M 1/32* (2013.01)

(58) Field of Classification Search
CPC ............... H02J 1/06; H02M 1/32; H02M 3/24
See application file for complete search history.

(56) References Cited

U.S. PATENT DOCUMENTS

2016/0159297 A1* 6/2016 Aoki ...................... B60R 16/03
174/72 A
2018/0334117 A1* 11/2018 Matsunaga ......... B60R 16/0207
(Continued)

FOREIGN PATENT DOCUMENTS

| CN | 201777204 | 3/2011 |
|---|---|---|
| CN | 205750382 | 11/2016 |

(Continued)

OTHER PUBLICATIONS

"International Search Report (Form PCT/ISA/210) of PCT/CN2022/080959," mailed on May 24, 2022, with English translation thereof, pp. 1-4.

(Continued)

*Primary Examiner* — Jue Zhang
(74) *Attorney, Agent, or Firm* — JCIPRNET

(57) ABSTRACT

A system power supply including an input power supply, a working power supply unit, a plurality of control modules, and a wiring harness is provided. The wiring harness includes a working power supply line and an input power supply line. An input power supply port of each control module is connected to the input power supply line, and a working power supply port is connected to the working power supply line. The input power supply is connected to the input power supply line, and an output of the working power supply unit is connected to the working power supply line. The present invention uses a working power supply line to provide working power supply to a plurality of control modules, eliminating the traditional operation of configuring an independent working power supply for each control module.

8 Claims, 4 Drawing Sheets

(56) References Cited

U.S. PATENT DOCUMENTS

2021/0382102 A1* 12/2021 Siddique .............. H02H 3/445
2022/0219626 A1*  7/2022 Yuan ................... B60R 16/023

FOREIGN PATENT DOCUMENTS

| CN | 209472166  | 10/2019 |
| CN | 211543432  |  9/2020 |
| JP | 2008284980 | 11/2008 |

OTHER PUBLICATIONS

"Written Opinion of the International Searching Authority (Form PCT/ISA/237) of PCT/CN2022/080959," mailed on May 24, 2022, pp. 1-4.

* cited by examiner

SYSTEM POWER SUPPLY

CROSS-REFERENCE TO RELATED APPLICATION

This application is a 371 of international application of PCT application serial no. PCT/CN2022/080959, filed on Mar. 15, 2022, which claims the priority benefit of China application no. 202110390283.5, filed on Apr. 12, 2021. The entirety of each of the above-mentioned patent applications is hereby incorporated by reference herein and made a part of this specification.

TECHNICAL FIELD

The present invention relates to the field of vehicle control technology, and specifically relates to a system power supply for distributing working power required by a plurality of control modules of a vehicle.

DESCRIPTION OF RELATED ART

The operating power required in a conventional control module is achieved by the power conversion included in the control module itself, and each control module has its own working power conversion configuration.

With the advancement of automobile technology, vehicle control modules are developing towards local electrical intelligence and miniaturization. The control system requires more control modules for on-board electrical appliance control. Factors such as unstable automobile input power and poor automobile electrical environment have increased the technical difficulty of configuring the working power conversion device of the control module, resulting in increased power conversion complexity, increased cost and reduced reliability.

Therefore, the mode of setting the working power supply for each control module itself is difficult to be used in the case of a plurality of control modules. It is also not conducive to miniaturization of a plurality of control modules, and the control system is also less economical.

SUMMARY

The object of the present invention is to provide a system power supply that provides working power supply to a plurality of control modules through one working power supply line, eliminating the traditional operation of configuring an independent working power supply for each control module, thereby realizing a control system with low cost and high reliability, and facilitating the miniaturization and circuit integration of the control module.

The technical solution of the present invention is:

A system power supply, comprising an input power supply, a working power supply unit, a plurality of control modules and a wiring harness. The wiring harness comprises a working power supply line and an input power supply line. An input power supply port of each control module is connected to the input power supply line, and a working power supply port of each control module is connected to the working power supply line. The input power supply is connected to the input power supply line, and an output of the working power supply unit is connected to the working power supply line.

The input power supply is an accumulator.

The input of the working power supply unit is the input power supply or an external power supply.

In the system power supply, at least one control module comprises the working power supply unit.

At least two working power supply units are provided, and the output end of each working power supply unit is connected to a control power supply line after being connected in series with a diode.

The working power supply unit is an isolated DC/DC power source. A positive input end of the isolated DC/DC power source is connected to the input power supply, and a negative output end of the isolated DC/DC power source is connected to a positive pole of the input power supply.

The working power supply unit is a DC/DC conversion power source. A positive input end of the DC/DC conversion power source is connected to the input power supply, and a negative output end of the DC/DC conversion power source is connected to a negative pole of the input power supply.

The plurality of control modules comprises a working power supply protection device, wherein an end of the working power supply protection device is connected to the working power supply line, and the other end provides working power supply for the control circuit board of the control module. The working power supply protection device comprises a self-recovery fuse, a current-limiting circuit, or a protection circuit composed of a self-recovery fuse and a current-limiting circuit connected in series.

The control circuit board of the control module is provided with a high-side drive circuit connected to the corresponding working power supply port, and the high-side drive circuit drives the electronic switch tube in the control module to be turned on and off.

INDUSTRIAL APPLICABILITY

The present invention only needs to provide at least one working power supply unit. Through the working power supply line and the input power supply line, the present invention can realize the distribution of input power supply and working power supply to the plurality of control modules, without the need to configure working power supply for each control module as usual. The main advantages of the system power supply of the present invention are as follows: (1) The control modules are easy to achieve micromation and miniaturization. (2) The reliability of the control system is improved. (3) The cost of the control system is saved.

DESCRIPTION OF THE EMBODIMENTS

Figure 1:
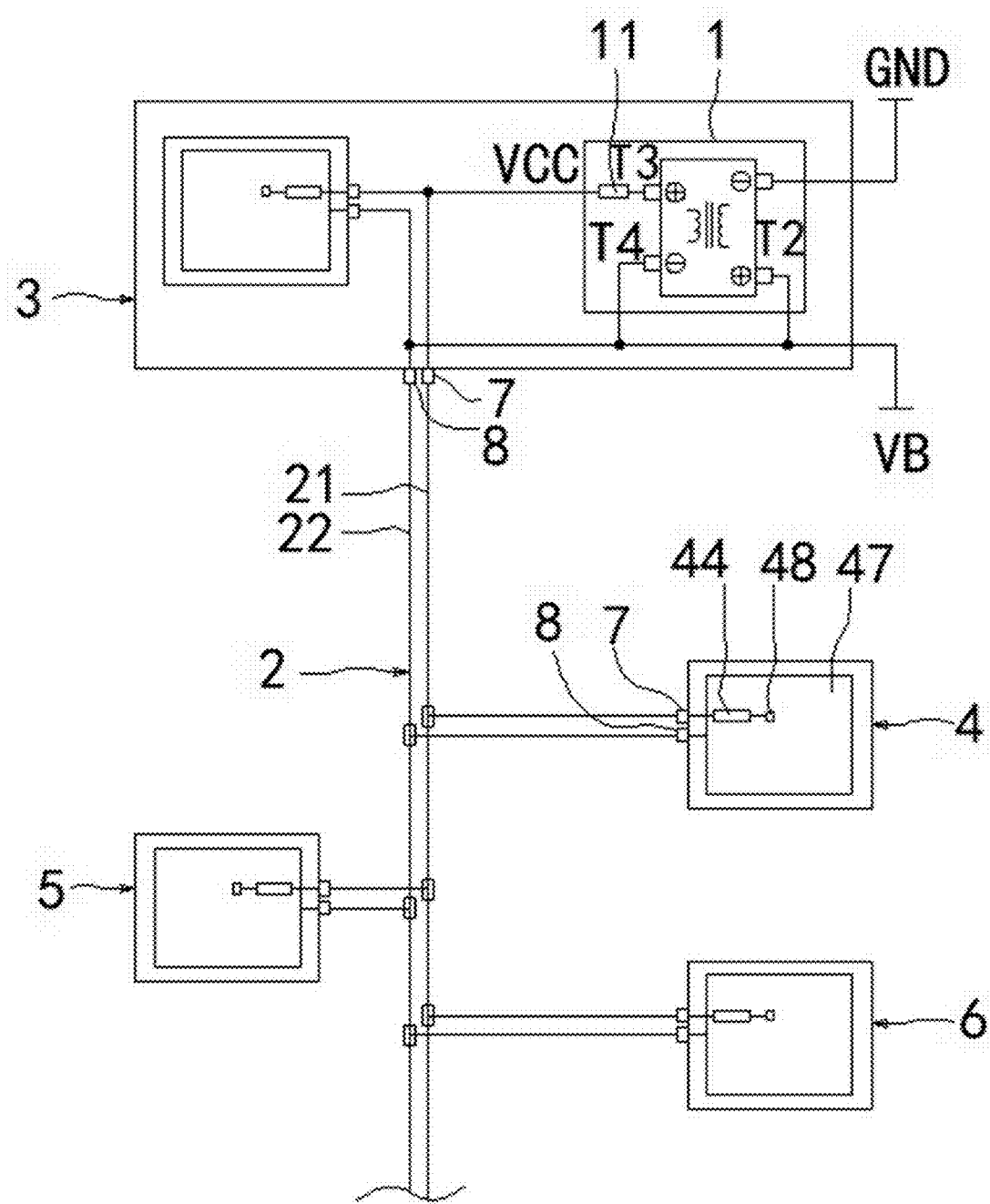
FIG. 1 is a schematic structural diagram of an embodiment of the present invention.

The technical solutions in the embodiments of the present invention will be clearly and completely described below with reference to the accompanying drawings in the embodiments of the present invention. Obviously, the described embodiments are only some of the embodiments of the present invention, rather than all the embodiments. Based on the embodiments of the present invention, all other embodiments obtained by those of ordinary skill in the art without creative efforts fall within the scope of protection of the present invention.

A system power supply comprises an input power supply VB, four control modules 3, 4, 5 and 6, and a wiring harness 2. The wiring harness 2 comprises a working power supply line 21 and an input power supply line 22. A working power supply of each control module is connected through a working power supply port 7, and the input power supply is connected through the input power supply port 8. The working power supply port 7 is connected to the working power supply line 21, and the input power supply port 8 is connected to the input power supply line 22, and the input power supply VB is connected to the input power supply line 22. An end of a self-recovery fuse 44 disposed on a control circuit board 47 is connected to the working power supply port 7, and the other end is loaded to an entry point 48 of the control circuit board of the control module. Among the four control modules 3, 4, 5 and 6, the control module 3 comprises a working power supply unit 1. An input end of the working power supply unit 1 is connected to the input power supply VB, and an output end of the working power supply unit 1 outputs a working power supply VCC and is connected to the working power supply line 21.

Referring to FIG. 1, the input power supply VB is an accumulator power supply. For vehicles with certain configurations, the input power supply may not use accumulator power supply, but may be fed by other power sources. For example, the input power supply on an electric vehicle may be provided by a power battery.

As shown in FIG. 1, the working power supply unit 1 comprises an isolated DC/DC power source and a self-recovery fuse 11. A positive input end T2 of the isolated DC/DC power source is connected to the input power supply VB, and a negative input end T1 of the isolated DC/DC power source is connected to GND (power ground or ground). A positive output end T3 of the isolated DC/DC power source is connected to the working power supply port 7 through the self-recovery fuse 11, and a negative output end T4 and the positive input end T2 of the isolated DC/DC power source are connected to the input power supply port 8.

When the isolated DC/DC power source is replaced with a DC/DC conversion power source, a positive input end T2 of the DC/DC conversion power source is connected to the input power supply VB. A negative input end T1 of the DC/DC conversion power source is connected to GND. A positive output end T3 is connected to the working power supply port 7 through the self-recovery fuse 11, and a negative output end T4 is connected to the negative input end T1, sharing GND (ground).

The control modules 4, 5 and 6 do not comprise a working power supply unit, and their working power is provided by the working power supply line 21. Each control module is equipped with a working power supply protection device. The working power supply protection device comprises a self-recovery fuse, a current-limiting circuit, or a protection circuit composed of a self-recovery fuse and a current-limiting circuit connected in series.

Figure 2:
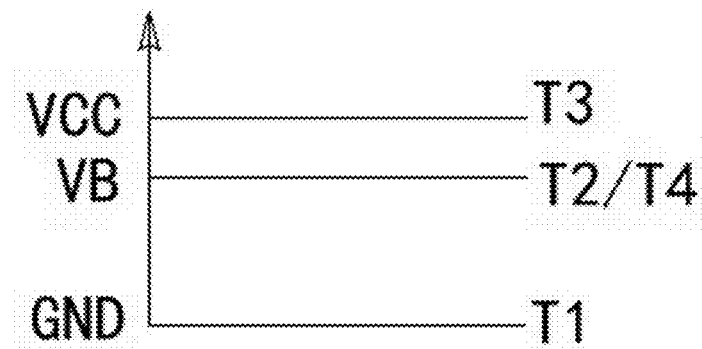
FIG. 2 is a relative relationship diagram between the system voltage and the working voltage of the working power supply of the present invention in a high-side state.

FIG. 2 is a diagram showing the level potential relationship between the working power supply VCC converted by the isolated DC/DC power source and the input power supply VB.

Figure 3:
FIG. 3 is a relative relationship diagram between the system voltage and the working voltage of the working power supply of the present invention in a low-side state.

FIG. 3 is a diagram showing the level potential relationship between the working power supply VCC converted by the DC/DC conversion power source and the input power supply VB.

Figure 4:
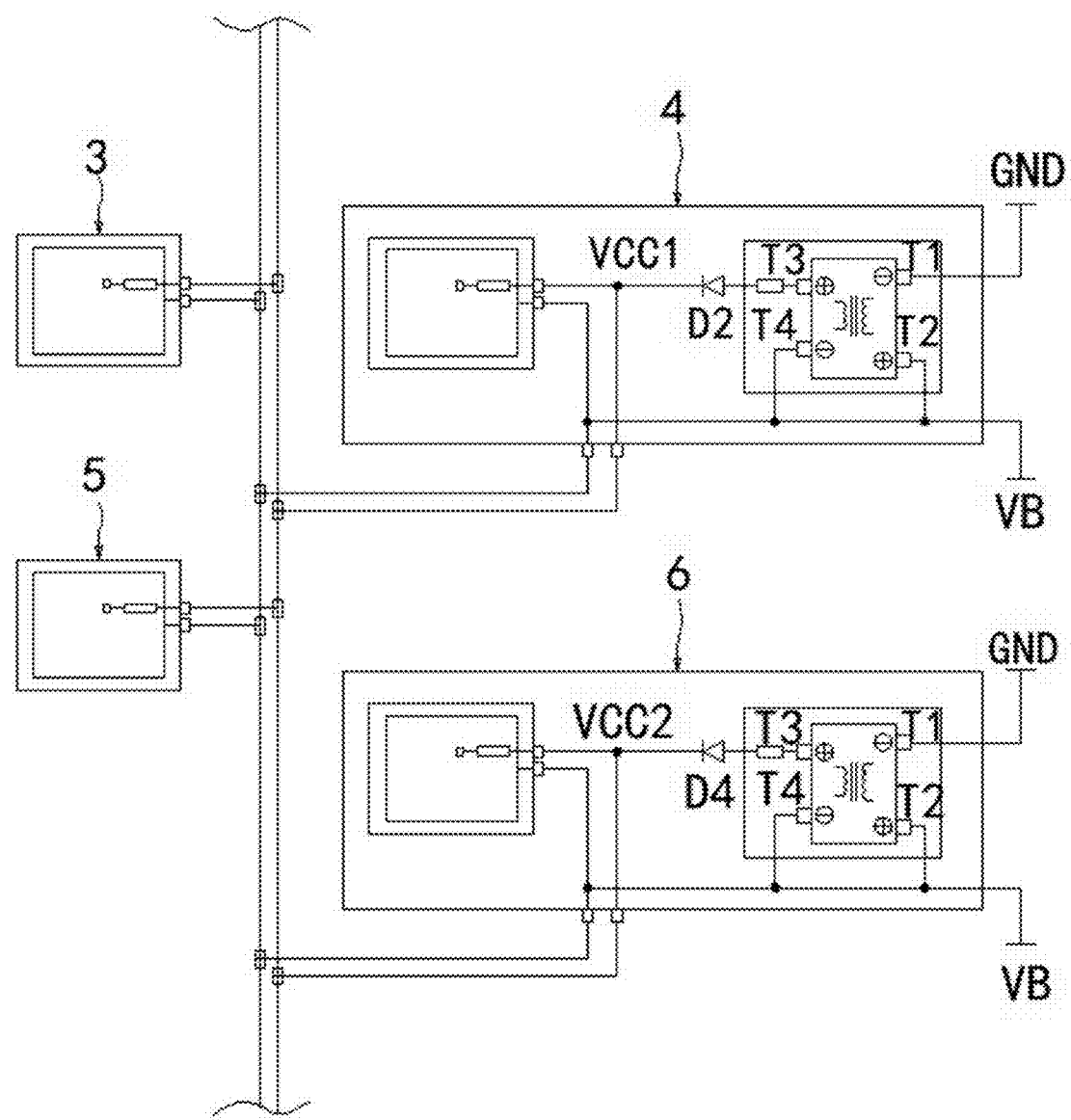
FIG. 4 is a system connection diagram of two control modules comprising working power supply units of the present invention.

Referring to FIG. 4, among the four control modules 3, 4, 5 and 6, both control modules 4 and 6 comprise working power supply units. Output ends of the two working power supply units are connected in series with diodes D2 and D4, respectively. The purpose of providing two working power supply units is to increase the power supply capacity and improve the reliability of the system.

In some control systems, in order to facilitate the maintenance of the working power supply or the provision of working power supply devices, an independent working power supply unit is provided. Principle diagram and explanation are omitted.

For the working power supply VCC provided in this embodiment, during the project implementation, the amplitude of the level of VCC and the amplitude of the control electrode conduction level of the electronic switch tube (generally referred to as an N-type MOS tube) are comprehensively selected, so that the working power supply VCC can not only meet the working power supply requirements of the control module, but also meet the control voltage requirements of the control module to drive N-type MOS tubes.

Figure 5:
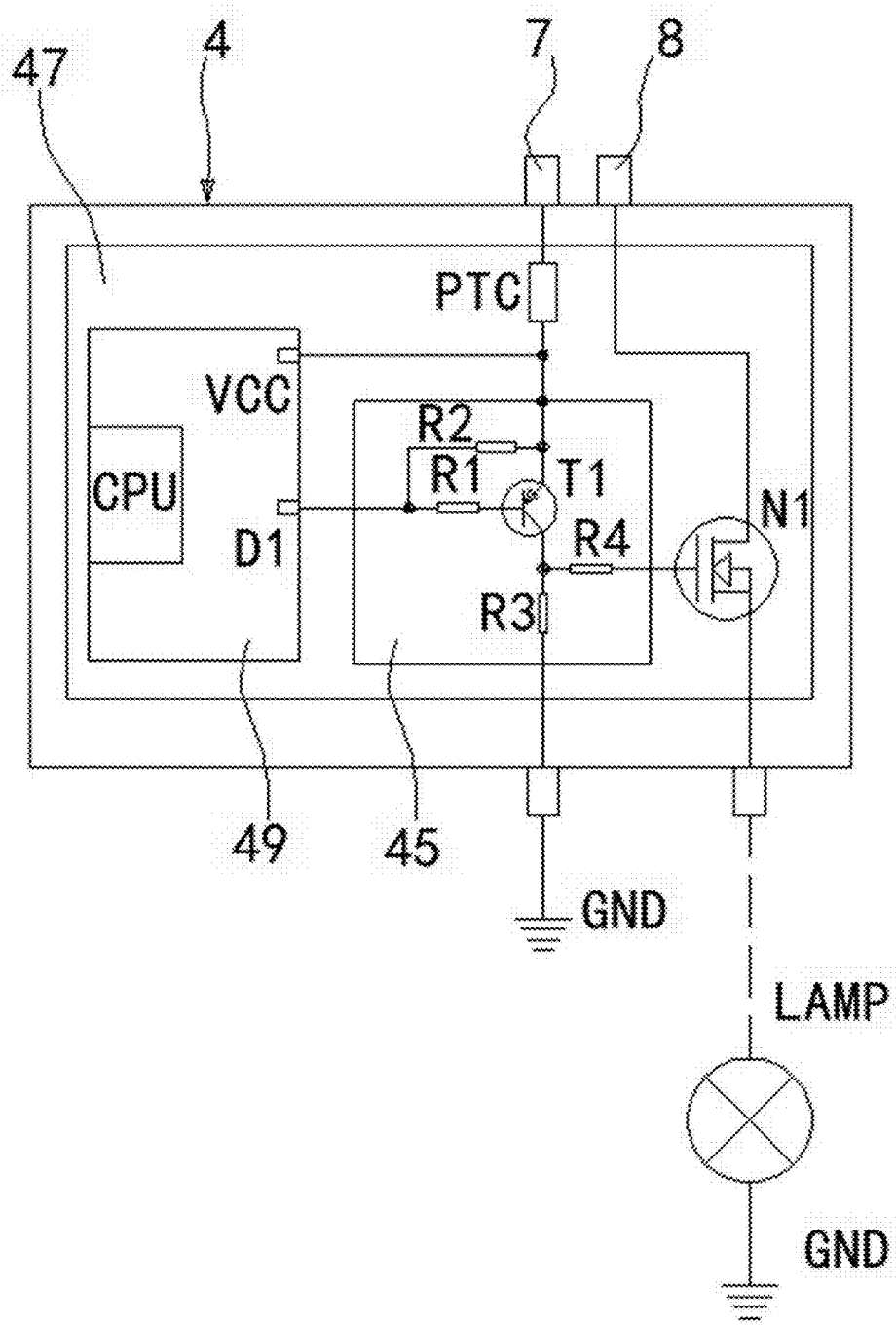
FIG. 5 is a principle diagram of the working power supply VCC driving an electronic switch tube.

As shown in FIG. 5, the control circuit board 47 of the control module 4 comprises a logic unit 49 and a driving unit 45. The D1 port of the logic unit 49 is used to control the electronic switch tube M1 to turn on and off. An output of the electronic switch tube M1 is connected to a load, i.e., a light bulb LAMP. In addition to the load of light bulb LAMP, the loads connected to the output of the electronic switch tube M1 also include primary electrical loads of the vehicle body, such as motors and electronic heaters.

The principle of the control circuit board 47 driving the electronic switch tube M1: First, when the logic unit 49 outputs a low level at the port D1 (the low level of the logic unit 49 is VB), a transistor T1 is turned on, the working power connected to the working power supply port 7 is loaded on a resistor R4 through a self-recovery fuse PTC and the transistor T1. Because the voltage drop of the self-recovery fuse PTC and the transistor T1 is small during normal operation, it is approximately assumed that the control voltage VCC is directly loaded on the resistor R4. Therefore, the electronic switch tube M1 is turned on. When the logic unit 49 outputs a high level at port D1 (or controls D1 to a high-impedance state), the transistor T1 is turned off, an input end of the resistor R4 is pulled to a low level by a resistor R3, and the electronic switch tube M1 is turned off and stops working.

The present invention provides the working power supply required for the operation of the control modules 3, 4, 5, and 6 through the working power supply port 7, which can meet the control requirements for the conduction of the electronic switch tubes, and does not need to provide a driving power supply, thereby saving costs and simplifying structure.

Although the embodiments of the present invention have been shown and described, those of ordinary skill in the art will understand that various changes, modifications, substitutions and variants can be made to these embodiments without departing from the principles and spirit of the invention. The scope of the invention is defined by the appended claims and their equivalents.

What is claimed is:

1. A system power supply, wherein the system power supply comprises:

an input power supply;
a working power supply unit;
a plurality of control modules; and
a wiring harness, wherein the wiring harness comprises a working power supply line and an input power supply line, an input power supply port of each of the plurality of control modules is connected to the input power supply line, and a working power supply port of each of the plurality of control modules is connected to the working power supply line,
wherein the input power supply is connected to the input power supply line, and an output of the working power supply unit is connected to the working power supply line,
wherein the input of the working power supply unit is the input power supply or an external power supply,
wherein the working power supply unit is an isolated DC/DC power source, wherein a positive input end of the isolated DC/DC power source is connected to the input power supply, and a negative output end of the isolated DC/DC power source is connected to a positive pole of the input power supply,
wherein the working power supply unit is a DC/DC conversion power source, a positive input end of the DC/DC conversion power source is connected to the input power supply, and a negative output end of the DC/DC conversion power source is connected to a negative pole of the input power supply.

2. The system power supply according to claim 1, wherein the input power supply is an accumulator.

3. The system power supply according to claim 1, wherein in the system power supply, at least one control module comprises the working power supply unit.

4. The system power supply according to claim 1, wherein at least two working power supply units are provided, and an output end of each of the at least two working power supply units is connected to a control power supply line after being connected in series with a diode.

5. The system power supply according to claim 1, wherein each of the plurality of control modules comprises a working power supply protection device, wherein an end of the working power supply protection device is connected to the working power supply line, and the other end of the working power supply protection device provides working power supply for a control circuit board of the control module, wherein the working power supply protection device comprises a self-recovery fuse, a current-limiting circuit, or a protection circuit composed of a self-recovery fuse and a current-limiting circuit connected in series.

6. The system power supply according to claim 1, wherein a control circuit board of the control module is provided with a high-side drive circuit connected to the corresponding working power supply port, and the high-side drive circuit drives an electronic switch tube in the control module to be turned on and off.

7. The system power supply according to claim 1, wherein the working power supply unit selects an amplitude of a level of the working power supply VCC and the amplitude of a control electrode conduction level of an electronic switch tube in the control module, so that the working power supply VCC can not only meet working power supply requirements of the control module, but also meet control voltage requirements of the control module to drive N-type MOS tubes.

8. The system power supply according to claim 1, wherein a control circuit board of the control module comprises a logic unit and a driving unit, wherein a D1 port of the logic unit is used to control an electronic switch tube M1 to turn on and off, and an output of the electronic switch tube M1 is connected to a load.

* * * * *